United States Patent

Hsieh et al.

Patent Number: 5,774,351
Date of Patent: Jun. 30, 1998

[54] SERIES RESONANT DC-TO-AC INVERTER SYSTEM

[75] Inventors: Guan-Chyun Hsieh; Chang-Huan Liu, both of Taipei, Taiwan

[73] Assignee: National Science Council, Taipel, Taiwan

[21] Appl. No.: 651,097

[22] Filed: May 21, 1996

[51] Int. Cl.$^6$ .............................. H02H 7/122; H02M 1/12
[52] U.S. Cl. ............................... 363/132; 363/17; 363/56
[58] Field of Search .............................. 363/132, 17, 40, 363/41, 79, 89, 124; 315/307, 308

[56] References Cited

U.S. PATENT DOCUMENTS

| | | | |
|---|---|---|---|
| 3,967,173 | 6/1976 | Stich | 318/227 |
| 4,757,434 | 7/1988 | Kawabata et al. | 363/41 |
| 5,412,557 | 5/1995 | Lauw | 363/37 |
| 5,514,935 | 5/1996 | Oda et al. | 315/82 |
| 5,576,940 | 11/1996 | Steigerwald et al. | 363/17 |

*Primary Examiner*—Peter S. Wong
*Assistant Examiner*—Rajnikant B. Patel
*Attorney, Agent, or Firm*—Townsend and Townsend and Crew LLP

[57] ABSTRACT

A series resonant DC-to-AC inverter. This inverter comprises a series-resonant circuit including a resonant capacitor and a resonant inductor, a diode parallel with the series resonant circuit, a switch device controlling the conduction condition between the series resonant circuit and a DC voltage, a cycloconverter and an output filter. The switch device is controlled by a pulse-width-modulated signal. During three operation stages of charging, resonance and discharging, an unipolar composite sinusoidal signal is formed at the resonant capacitor. The cycloconverter transforms the unipolar composite sinusoidal signal into a bipolar composite sinusoidal signal and then the output filter filters out its high-frequency components to generate an AC voltage.

12 Claims, 13 Drawing Sheets

SERIES RESONANT DC-TO-AC INVERTER SYSTEM

BACKGROUND OF THE INVENTION

1. Field of the Invention

The present invention in general relates to a DC-to-AC inverter system. More specifically, the present invention relates to a series resonant DC-to-AC inverter system, a modified pulse-width modulator for generating its control signal, and an inversion method of this inverter system.

2. Description of the Prior Art

Recently, the uninterrupted power supply (UPS) has been an important equipment for electronic apparatuses. It is often used as a continuous and non-fluctuating power source for a variety of applications to avoid power interruption. A computer system, for example, can make use of the UPS to prevent loss of the permanent data of dynamic memories during an unexpected power interruption at home or in the office. In addition, the UPS is likely to become an energy-converting building block in the combination of mechanic-electronic devices and a power system in the future.

A general UPS minimally includes an AC-to-DC converter, a battery charger and a DC-to-AC inverter, where the DC-to-AC inverter is the most important component of all. In recent times, two approaches, phase-controlled (hereafter called PC) and pulse-width-modulated (hereafter called PWM) techniques, are mainly used in the DC-to-AC inverter of a UPS.

FIG. 1 (PRIOR ART) illustrates a circuit diagram of a conventional PWM inverter. An isolation transformer $T_1$ separates this PWM inverter into a front-end stage and a rear-end stage. The front-end stage includes switching devices $S_{11}$ to $S_{14}$ and the accompanying diodes $D_{11}$ to $D_{14}$. The rear-end stage includes another set of switching devices $S_{15}$ and $S_{18}$ and an output filter including an inductor $L_0$ and a capacitor $C_0$. It is apparent that the realized circuit must be heavy due to the low-frequency isolation transformer $T_1$. In addition, the PWM inverter is subject to high stress, high switching loss, and large EMI (electromagnetic interference).

The PC technique has been proposed by Mc Murray since 1970. The main object of this research is to improve on the drawbacks of the PWM technique. FIG. 2 (PRIOR ART) is a circuit diagram of an example of a phase-controlled DC-to-AC inverter, which was proposed by K. Harade, H. Sakamoto and M. Shoyama in 1988. Since the transformer $T_2$ is shifted to the front-end portion, the switching frequency can be increased and thus the size of the transformer can be decreased. FIG. 3A and FIG. 3B (PRIOR ART) show timing diagrams of control signals used in the FIG. 2 circuit. Switch devices $S_{21}$–$S_{24}$ individually turn on in the intervals of time slots $K_1$–$K_4$. A plurality of square waves are formed by using the control signals to adjust the conversion ratio of the input and the output. Then these square waves are filtered out to generate a sinusoidal signal by the output filter including inductor $L_0$ and capacitor $C_0$. The main drawback of the phase-controlled technique is that a great deal of EMI is generated due to the square waves.

SUMMARY OF THE INVENTION

The object of the present invention is to provide a DC-to-AC inverter, which has low voltage and current stress, low switching loss and low EMI (electromagnetic interference). In addition, the DC-to-AC inverter can be smaller, lighter, and cheaper than the prior art.

According to the object, the present invention provides a series resonant DC-to-AC inverter, comprising:

a series resonant circuit including a resonant inductor and a resonant capacitor, coupled to a DC voltage;

a diode having an anode and a cathode, connected in parallel with the series resonant circuit, the anode of the diode being connected to a negative terminal of the DC voltage, the cathode of the diode being connected to a positive terminal of the DC voltage;

a first means responsive to a pulse-width-modulated signal for switching the conduction condition between the series resonant circuit and the DC voltage to generate a unipolar composite sinusoidal signal at the resonant capacitor;

a cycloconverter for transforming the unipolar composite sinusoidal signal to a bipolar composite sinusoidal signal, connected in parallel with the resonant capacitor of the series resonant circuit; and a means for filtering out high-frequency components of the bipolar composite sinusoidal signal and generating an AC voltage.

The cycloconverter therein includes:

a second means responsive to a first square-wave modulated signal for switching the conduction condition between one end of the resonant capacitor and one end of an output of the cycloconverter;

a third means responsive to the first square-wave modulated signal for switching the conduction condition between another end of the resonant capacitor and another end of the output of the cycloconverter;

a fourth means responsive to a second square-wave modulated signal that does not interlace with the first square-wave modulated signal for switching the conduction condition between the another end of the resonant capacitor and the one end of the output of the cycloconverter; and a fifth means responsive to the second square-wave modulated signal for switching the conduction condition between the one end of the resonant capacitor and the another end of the output of the cycloconverter.

The pulse-width-modulated signal used in the series resonant DC-to-AC inverter is generated by a pulse-width modulator, which includes:

a means for generating a sinusoidal signal with a frequency that is the same as the frequency of the AC voltage;

a means for generating a triangular signal with a frequency that is the same as the switching frequency of the first switching means;

a means for inverting the sinusoidal signal to generate an inverted sinusoidal signal;

a means for comparing the inverted sinusoidal signal with the triangular signal to generate a first comparison signal;

a means for comparing the sinusoidal signal with the triangular signal to generate a second comparison signal;

a means for operating an exclusive-or operation of the first comparison signal and the second comparison signal to generate a pulse-width modulated signal; and a means for alternately removing the pulses of the pulse-width-modulated signal whereby the duty cycle of the pulse-width-modulated signal is less than 50%.

BRIEF DESCRIPTION OF THE DRAWINGS

The detailed description of an embodiment of the present invention is made with reference to the accompanying drawings, wherein.

DETAILED DESCRIPTION OF THE PREFERRED EMBODIMENT

The series resonant DC-to-AC inverter in the present invention is presented for driving switching devices to operate in a forced discontinuous-conduction mode (FDCM) so as to achieve series resonance. There is a series of quasi-sinusoidal pulses formed by series resonance and an AC sinusoidal waveform is synthesized by these quasi-sinusoidal pulses. No square-pulsed voltage or current waveform will occur on the power switch during the switching period so that high-frequency harmonic distortion may be apparently reduced. The following are detailed descriptions of the inverter circuit, the pulse-width modulator and their operation.

Figure 1:
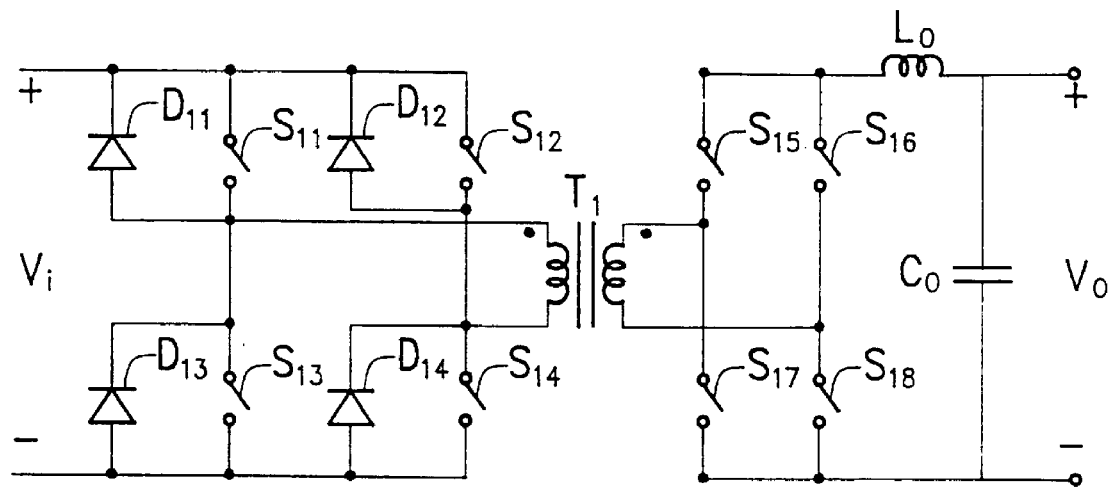
FIG. 1 (PRIOR ART) is a circuit diagram of a conventional pulse-width-modulated DC-to-AC inverter.
Figure 2:
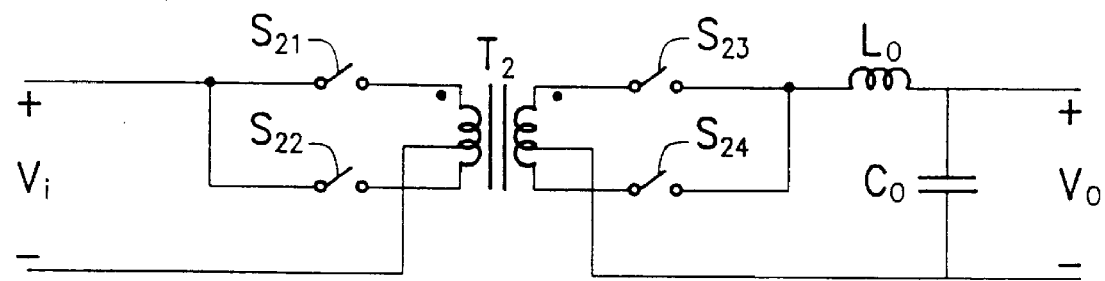
FIG. 2 (PRIOR ART) is a circuit diagram of an example of a phase-controlled DC-to-AC inverter.
Figure 3A:
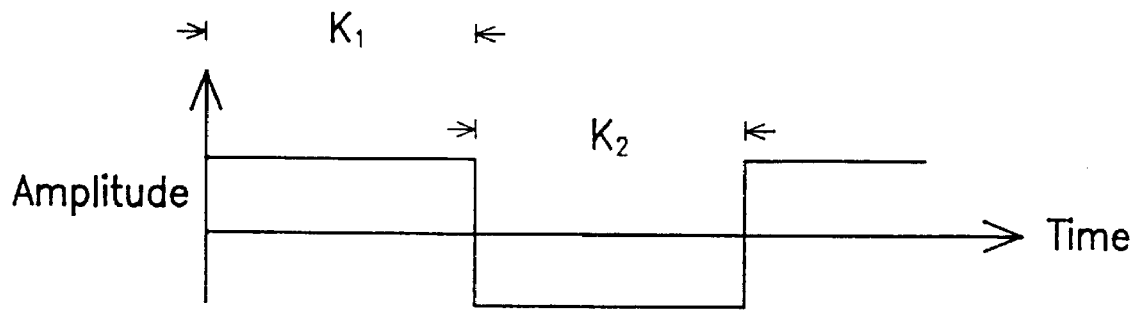
FIG. 3A and FIG. 3B (PRIOR ART) show timing diagrams of control signals used in the FIG. 2 circuit.
Figure 3B:
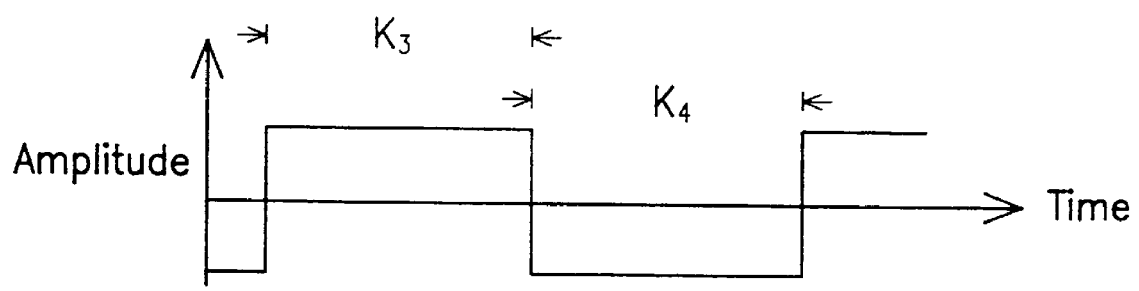
Figure 4:
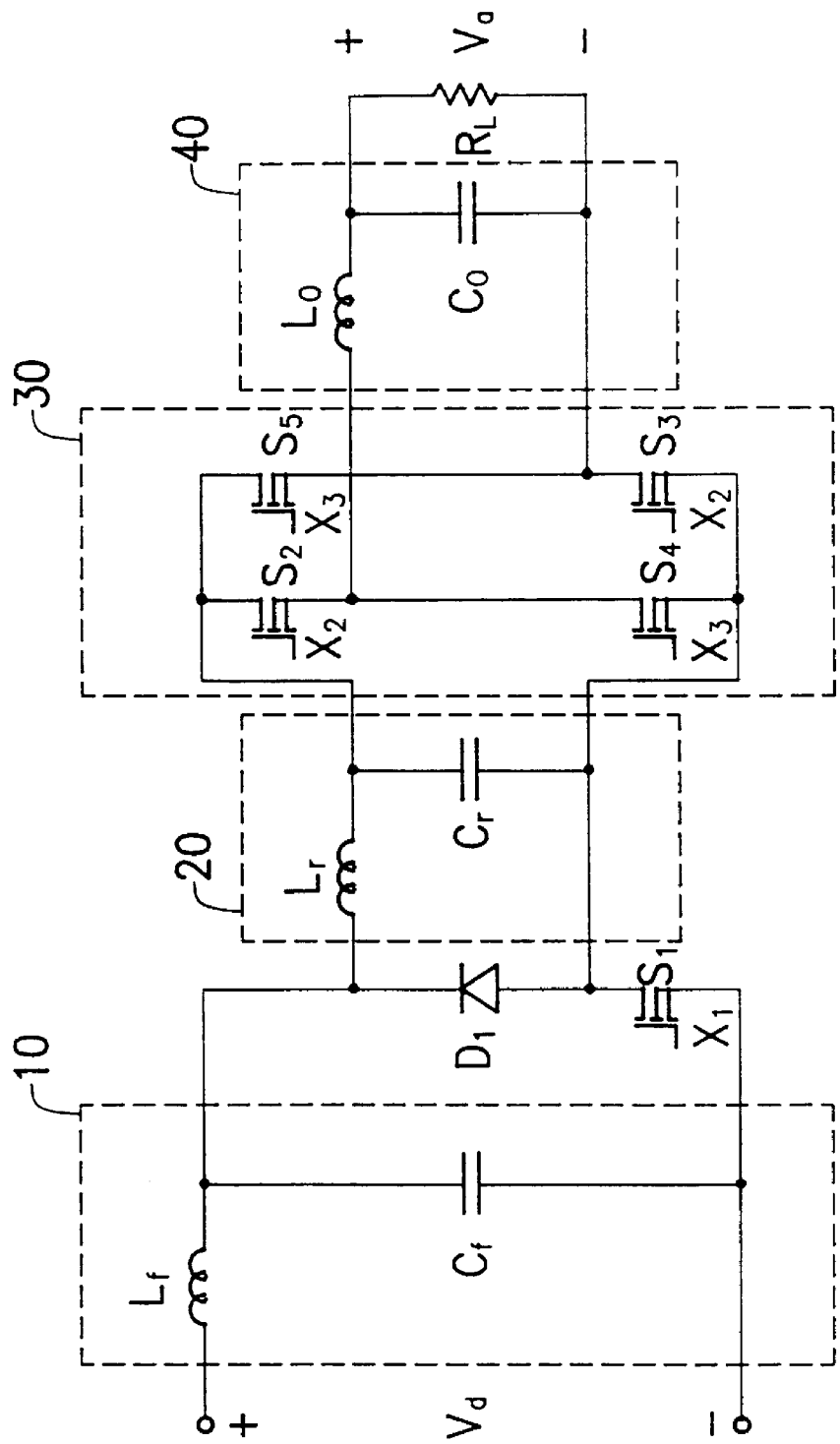
FIG. 4 is a circuit diagram of a series resonant DC-to-AC inverter in the embodiment of the present invention.

FIG. 4 is a circuit diagram of a series resonant DC-to-AC inverter in this embodiment. This inverter comprises an input filter 10 (including a capacitor $C_f$ and an inductor $L_f$), a switch device $S_1$ (a MOS transistor in this embodiment), a diode $D_1$, a series resonant circuit 20 (including a resonant capacitor $C_r$ and a resonant inductor $L_r$), a cycloconverter 30 (including switch devices $S_2$, $S_3$, $S_4$ and $S_5$), and an output filter 40 (including a capacitor $C_O$ and an inductor $L_O$). Resistor $R_L$ represents a load of the inverter. In addition, input filter 10 is an optional component which is used to eliminate bursts of DC voltage $V_d$. The diode $D_1$ is connected in parallel with the series resonant circuit 20, wherein the anode and the cathode of diode $D_1$ are respectively coupled to the negative and positive terminals of the DC voltage $V_d$. The inversion operation of the present invention is achieved by using a PWM signal $X_1$ applied to switch device $S_1$, by using a high-frequency square-wave modulated signal $X_2$ applied to switch devices $S_2$ and $S_3$, and by using a high-frequency square-wave modulated signal $X_3$ applied to switch devices $S_4$ and $S_5$.

Figure 5A:
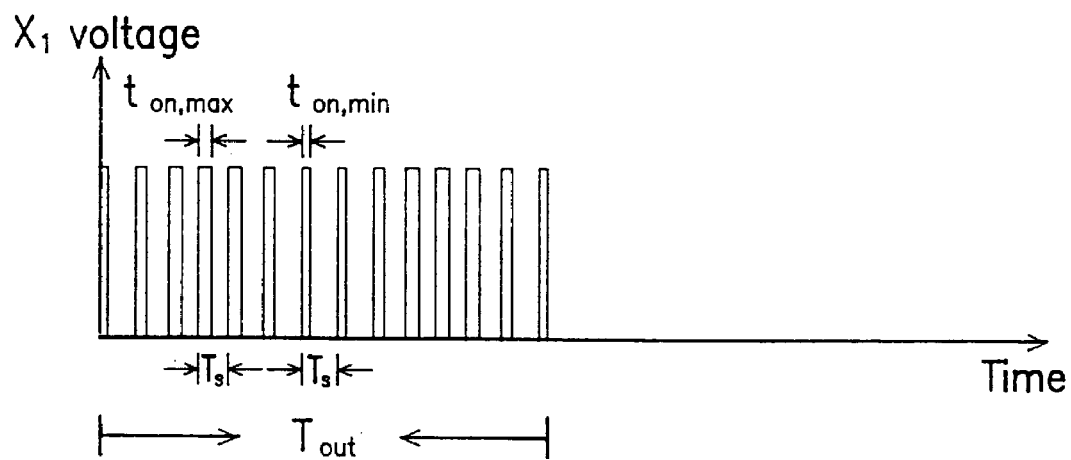
FIG. 5A to FIG. 5C show timing diagrams of control signals used in the FIG. 4 circuit.
Figure 5B:
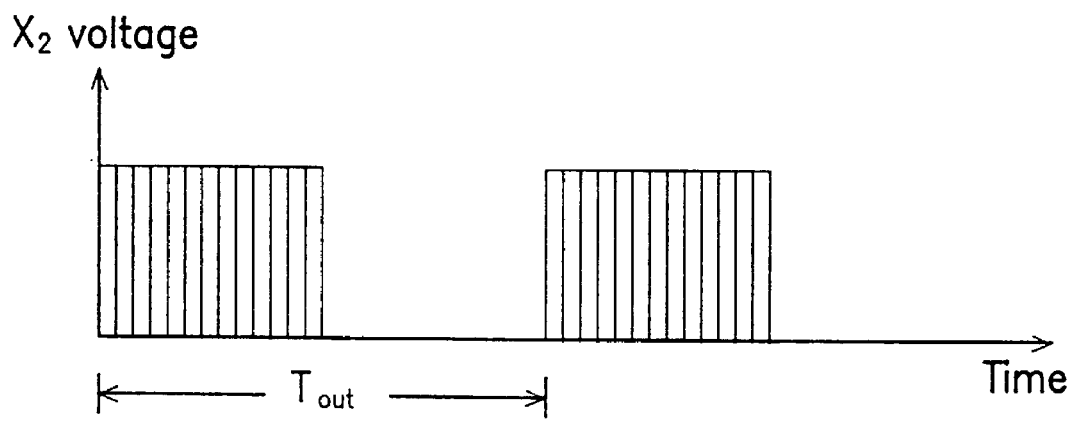
Figure 5C:
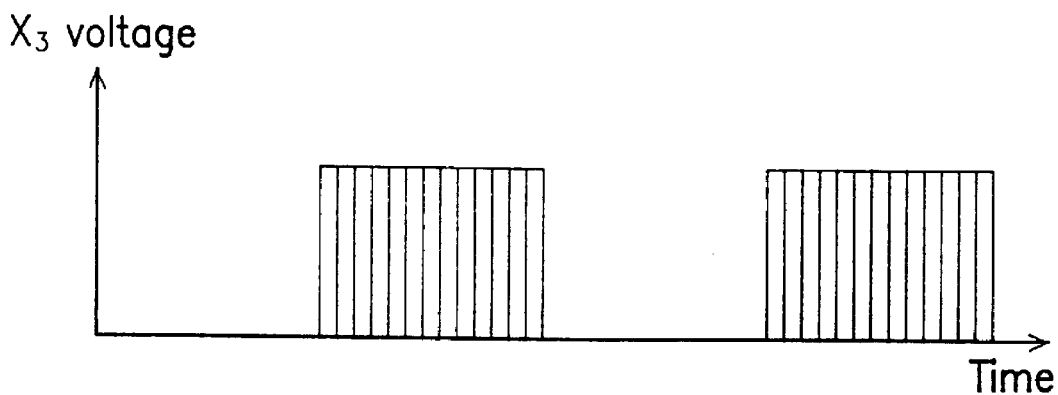

Signals $X_1$, $X_2$, and $X_3$ in this embodiment are illustrated in FIG. 5A, FIG. 5B and FIG. 5C, respectively. As shown in FIG. 5A, PWM signal $X_1$ is constituted by a series of pulses or a pulse train. The pulse period is $T_S$ but the pulse width changes in proportion to the amplitude of a sinusoidal wave with a period of $T_{out}$. For example, a pulse with a width $t_{on,max}$ corresponds to the peak amplitude of the sinusoidal wave and a pulse with a width $t_{on,min}$ corresponds to the zero amplitude of the sinusoidal wave. Preferably, the signal $X_1$ has a duty ratio less than 50%, to be suitable for resonant operation in this embodiment. As shown in FIG. 5B and FIG. 5C, signals $X_2$ and $X_3$ can be regarded as a high-frequency carrier modulated by a square-wave with a period of $T_{out}$. In addition, signals $X_2$ and $X_3$ interlace with each other and do not coincide in time. Using the high-frequency carrier can reduce the size, and even the weight of the driving transformer.

Referring to FIG. 4, the operation of the PWM signal $X_1$, which can make the switch device $X_1$ turn on or turn off, is described as follows. During the interval of each pulse, there are three successive operation stages: charging, resonance and discharging. The equivalent circuits corresponding to the three stages are schematically demonstrated in FIG. 6A, FIG. 6B and FIG. 6C, respectively. For simplicity, assume the equivalent resistance of cycloconverter 30, output filter 40 and load $R_L$ in FIG. 4 as $R_L$.

Figure 6A:
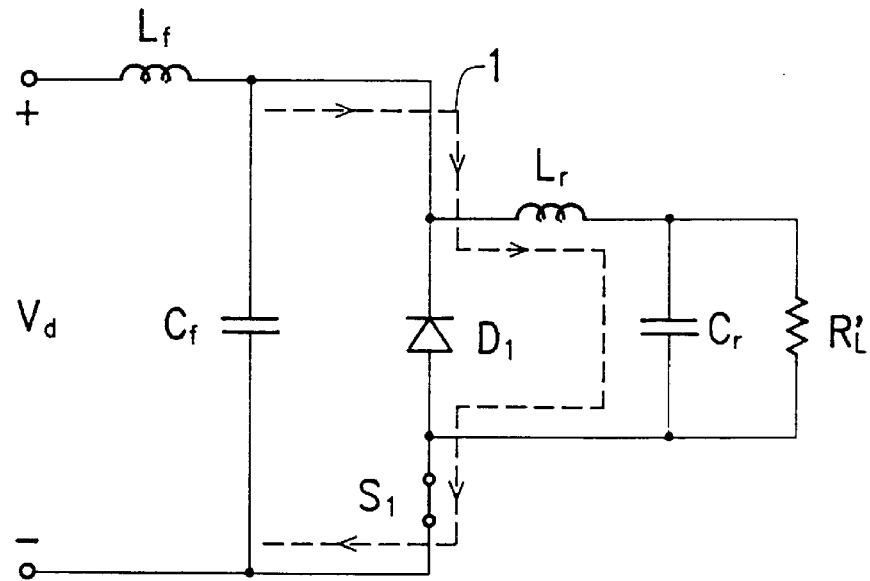
FIG. 6A to FIG. 6C respectively illustrate three operation stages (charging, resonance and discharging) of the embodiment of the present invention.

FIG. 6A shows the equivalent circuit in the charging stage. When a driving pulse arrives (that is, in the logic high state) and turns on the switch device $S_1$, diode $D_1$ is reverse-biased and turns off. A charging loop 1, consisting of DC voltage $V_d$, inductor $L_f$, resonant inductor $L_r$, and resonant capacitor $C_r$ in parallel with load $R_L$, is then formed. Resonant capacitor $C_r$ and resonant inductor $I_r$ are electrically charged by DC voltage $V_d$. It is apparent that the resonant inductor current $I_{Lr}$ and the resonant capacitor voltage $V_{cr}$ will increase during the charging process.

Figure 6B:
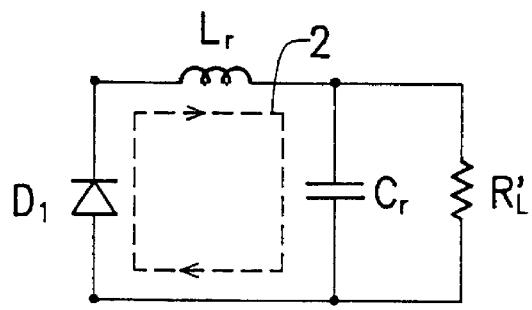

FIG. 6B shows the equivalent circuit in the resonant stage. When the back edge of the driving pulse turns off switch $S_1$ (that is, in the logic low state), the diode $D_1$ will turn on by the stored energy of the resonant circuit 20. Then series resonance is formed through resonant inductor $L_r$, resonant capacitor $C_r$ in parallel with load $R_L$, and diode $D_1$. In this stage, the residual energy stored in the resonant inductor $L_r$ is transferred to resonant capacitor $C_r$, through a resonant loop 2, until null. It is also apparent that the resonant capacitor voltage $V_{cr}$ will increase but the resonant inductor current $I_{Lr}$ will decrease. When the stored energy in the resonant inductor $L_r$ is empty, the inverter will switch to the discharging stage.

Figure 6C:
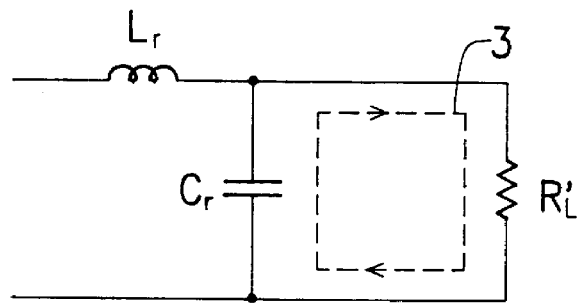

FIG. 6C shows the equivalent circuit in the discharging stage. When the energy stored in $L_r$ discharges to null, the diode $D_1$ promptly ceases conduction. The resonant capacitor $C_r$ then discharges its energy to the load $R_L$ through a discharging loop 3 until the subsequent driving pulse of signal $X_1$ arrives and the resonant capacitor $C_r$ begins to charge again.

Figure 7:
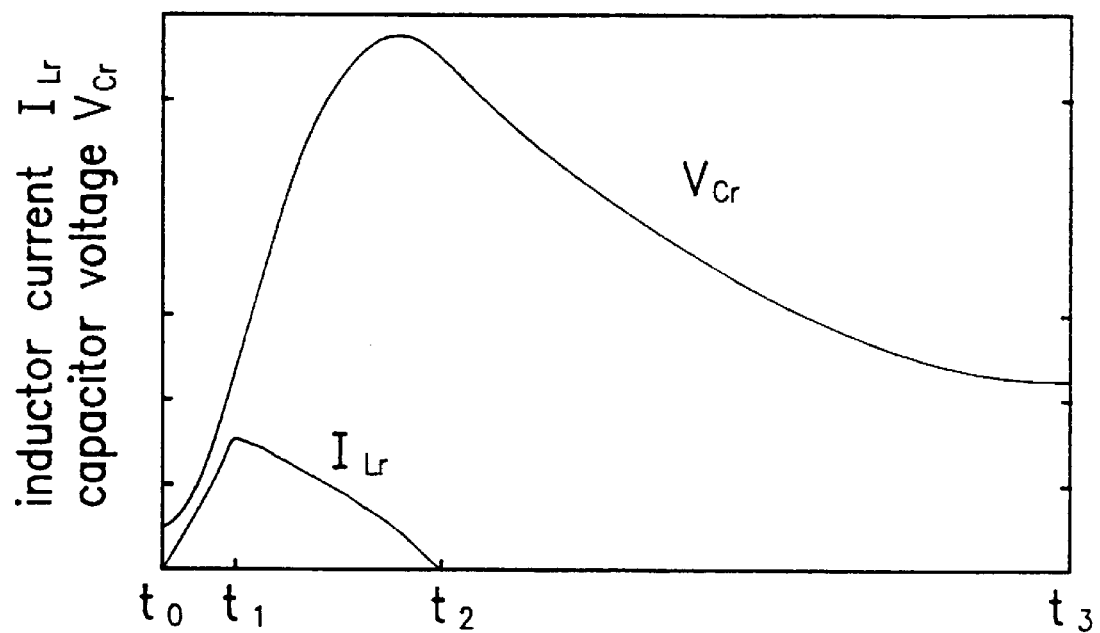
FIG. 7 shows signal diagrams of resonant inductor current and resonant capacitor voltage during a typical switching period in this embodiment of the present invention.

FIG. 7 shows signal diagrams of resonant inductor current $I_{Lr}$ and resonant capacitor voltage $V_{cr}$ during a typical switching period of switch $S_1$. The charging stage lies between $t_0$ and $t_1$, the resonant stage lies between $t_1$ and $t_2$, and the discharging stage lies between $t_2$ and $t_3$. At the time $t_0$, switch $S_1$ turns on and the charging loop 1 shown in FIG. 6A is formed. At the time $t_1$, switch $S_1$ turns off and the resonant loop 2 shown in FIG. 6B is formed. At the time $t_2$, switch $S_1$ still turns off, the stored energy of the resonant inductor $L_r$ is entirely transferred to the resonant capacitor $C_r$, and the discharging loop 3 is formed. These stages of charging, resonance and discharging will recur in each pulse of signal $X_1$. However, notice that there is something different between them. As shown in FIG. 5A, the pulses of the PWM signal $X_1$ have different pulse widths, or different duty cycles. This means that the charging stage will last for different lengths of time during the various pulses of the PWM signal $X_1$. Therefore, the resonant inductor current $I_{Lr}$ and the resonant capacitor voltage $V_{cr}$ corresponding to each pulse also vary with each other.

Figure 8:
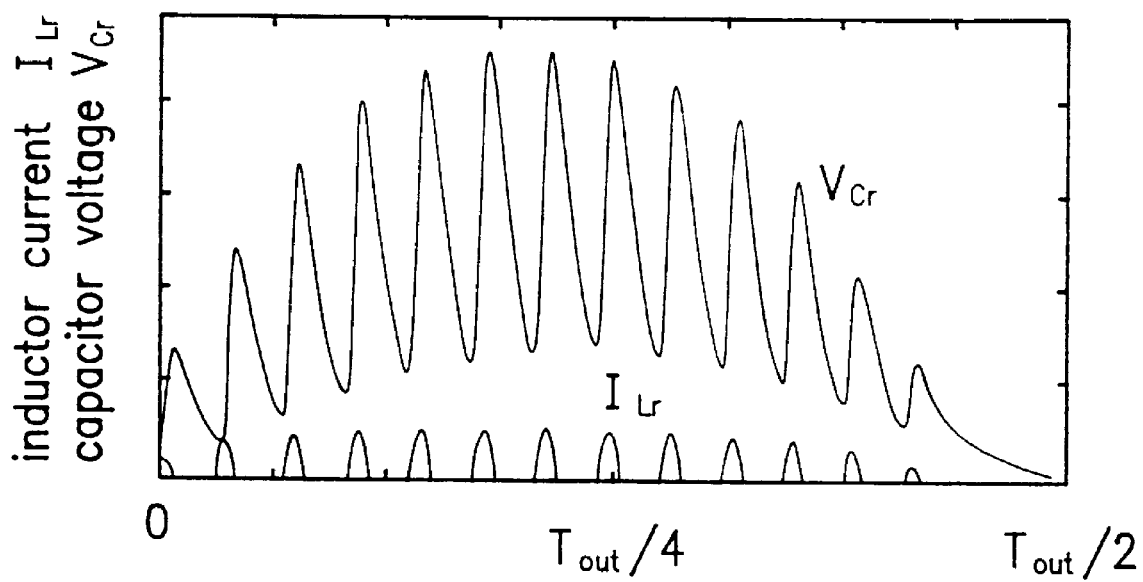
FIG. 8 shows signal diagrams of resonant inductor current and resonant capacitor voltage in the period of 0 to $T_{out}/2$.

FIG. 8 shows signal diagrams of resonant inductor current $I_{Lr}$ and resonant capacitor voltage $V_{cr}$ in the period of 0 to $T_{out}/2$, where $T_{out}$ is the period of the modulating sinusoidal wave of the signal $X_1$. Referring to FIG. 5A, the narrower pulses of the signal $X_1$ are near time 0 and $T_{out}/2$, and the wider pulses of the signal $X_1$ are near time $T_{out}/4$. Therefore, values of the resonant inductor current $I_{Lr}$ and the resonant capacitor voltage $V_{cr}$ near time 0 and $T_{out}/2$ are lower due to the shorter charging time. On the other hand, those near time $T_{out}/4$ are higher due to the longer charging time. In addition, the resonant voltage $V_{cr}$ does not decrease to zero in the discharging stage and will have a DC component. As shown in FIG. 8, the envelope of the resonant voltage $V_{cr}$ looks like an unipolar sinusoidal wave and then $V_{cr}$ is referred to as a unipolar composite sinusoidal waveform.

Figure 9A:
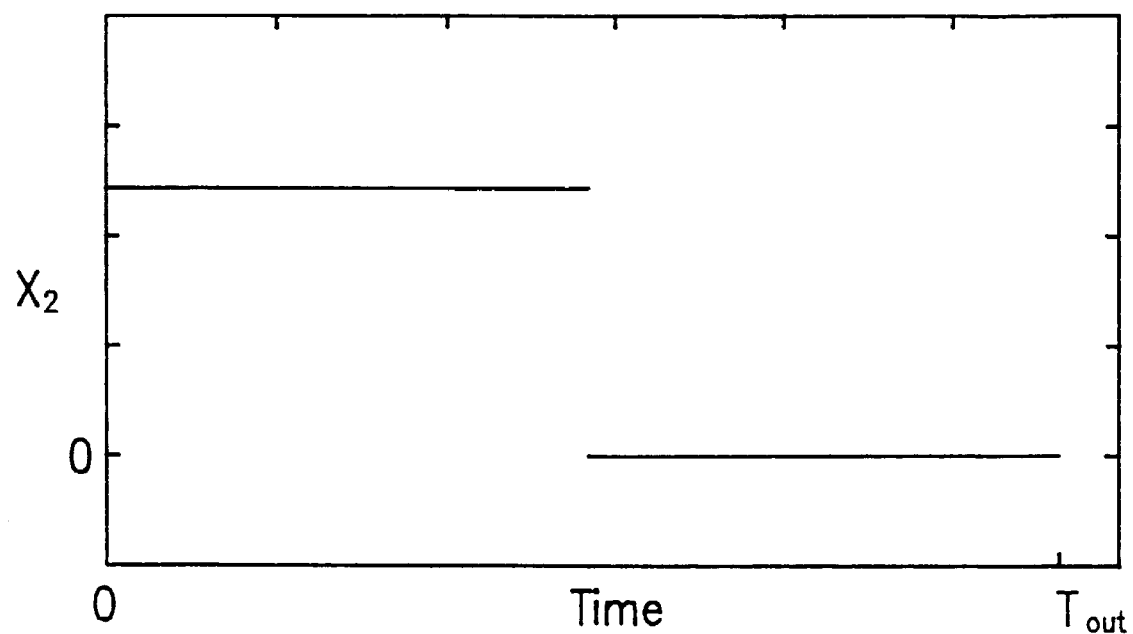
FIG. 9A to FIG. 9E respectively show corresponding signal diagrams of the high-frequency square-wave modulated signals $X_2$ and $X_3$, the unipolar composite sinusoidal signal, the bipolar composite sinusoidal signal, and the AC voltage in this embodiment of the present invention.
Figure 9B:
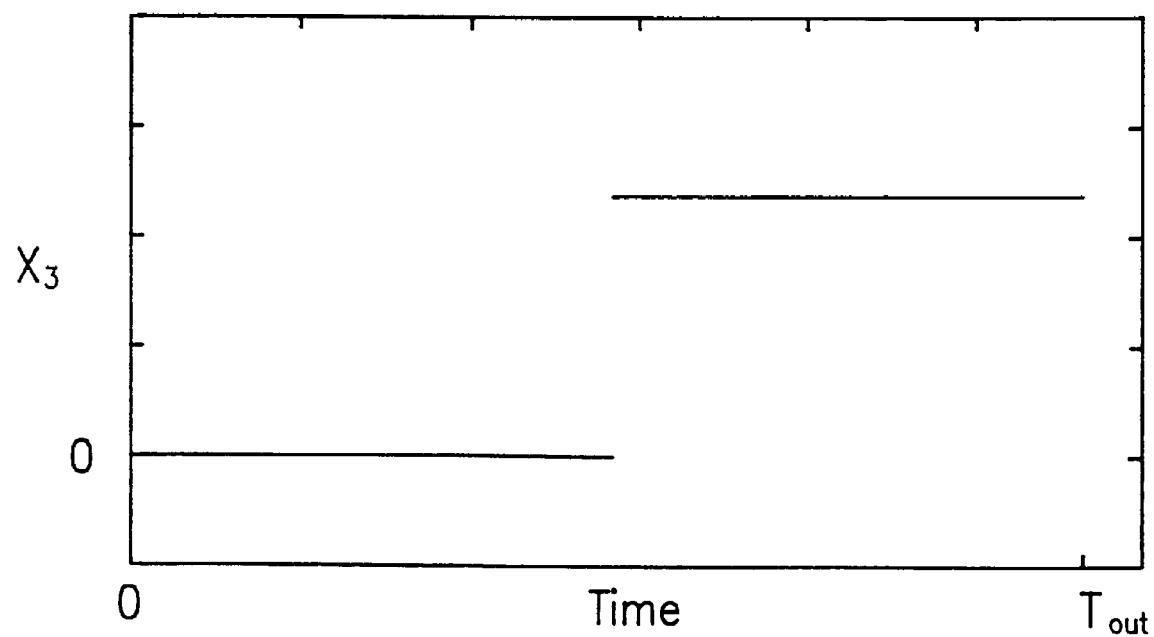
Figure 9C:
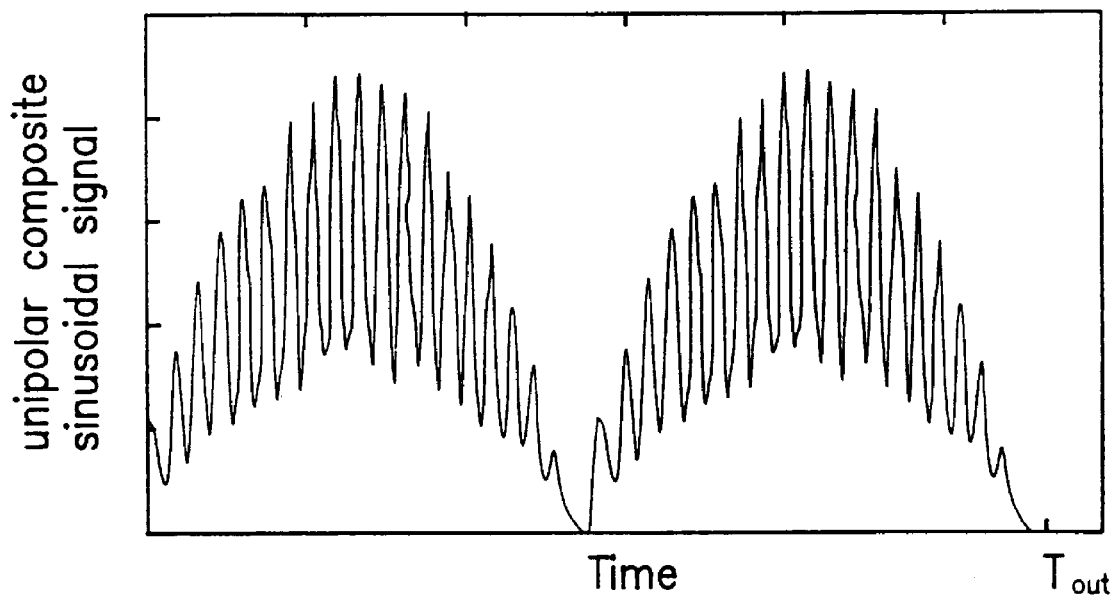
Figure 9D:
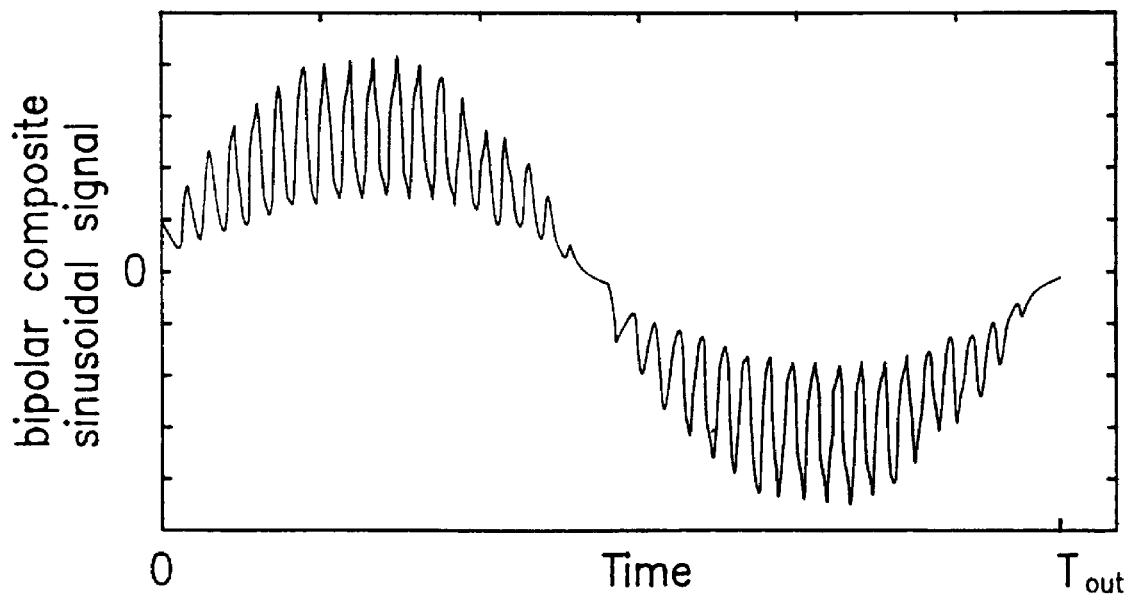
Figure 9E:
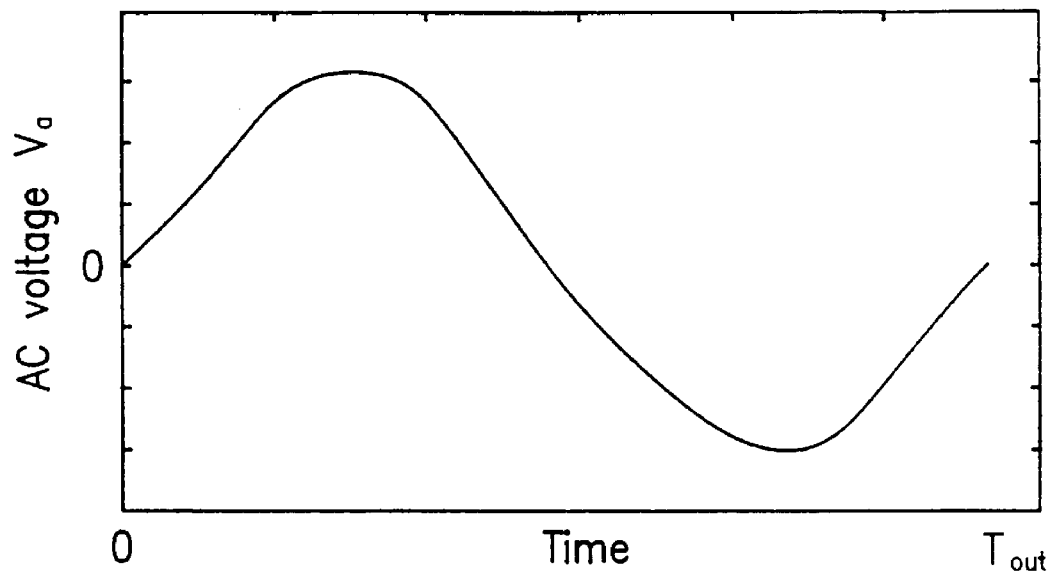

The unipolar composite sinusoidal waveform in the resonant capacitor $C_r$ is transformed into an AC voltage $V_a$ by the cycloconverter 30 and the output filter 40. For clarity, FIG. 9A and FIG. 9B repeatedly show the envelopes of the high-frequency square-wave modulated signals $X_2$ and $X_3$. Signal $X_2$ is used to control the on or off mode of switch devices $S_2$ and $S_3$. Signal $X_3$ is then used to control the on or off mode of switch devices $S_4$ and $S_5$. The cycloconverter 30, including switches $S_2$, $S_3$, $S_4$, and $S_5$, will transform the unipolar composite sinusoidal waveform into a bipolar composite sinusoidal waveform. For clarity, FIG. 9C shows again the unipolar composite sinusoidal waveform, and the resulting bipolar composite sinusoidal waveform is illustrated in FIG. 9D. The bipolar composite sinusoidal waveform can be regarded as a high-frequency signal modulated by a sinusoidal signal with a period of $T_{out}$. The AC voltage $V_a$ shown in FIG. 9E, then is obtained by using output filter 50 to filter out the high-frequency components of the bipolar composite sinusoidal waveform.

The DC-to-AC inverter can be implemented by common electrical devices. For example, switch devices $S_1$ to $S_5$ can be MOS transistors controlled by the corresponding control signals, as shown in FIG. 4. In addition, switch device $S_1$ in this embodiment is used to control the conduction condition of the charging path. However, in other embodiments, the switch device used to control the charging path can be more than one, and it also can be connected to the cathode of the diode rather than to the anode in this embodiment. In addition, high-frequency square-wave modulated signals $X_2$ and $X_3$ can be realized by general modulation techniques. Finally, the scheme of generating the PWM signal $X_1$ is described as follows.

Figure 10:
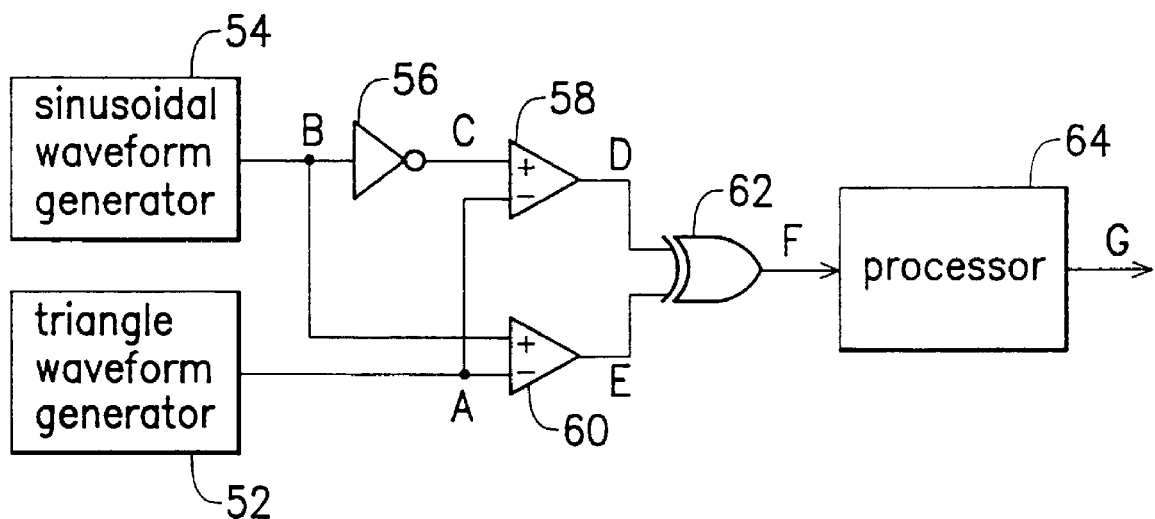
FIG. 10 is a circuit diagram of a pulse-width modulator in this embodiment of the present invention.
Figure 11A:
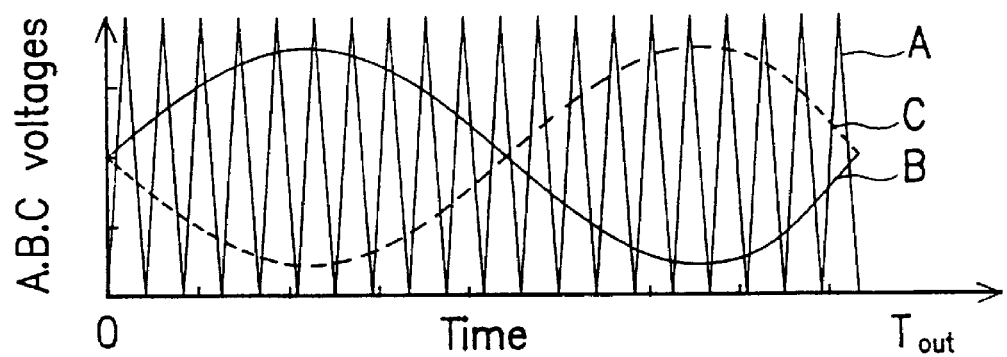
FIG. 11A to FIG. 11E respectively show signal diagrams at all nodes in the FIG. 10 circuit.
Figure 11B:
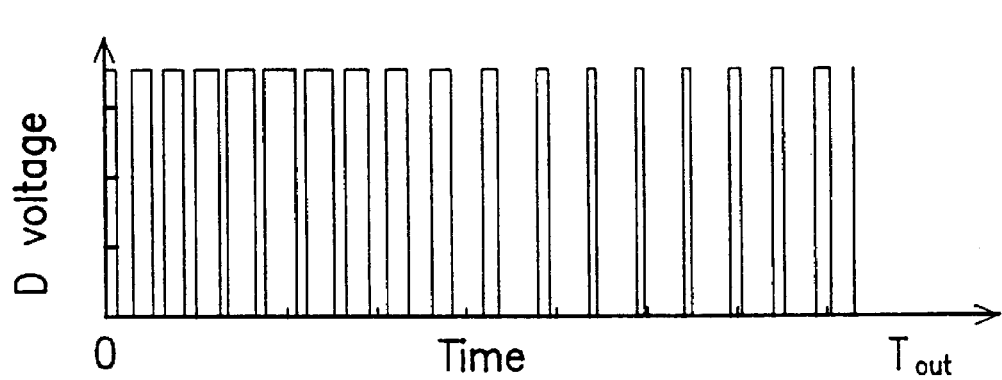
Figure 11C:
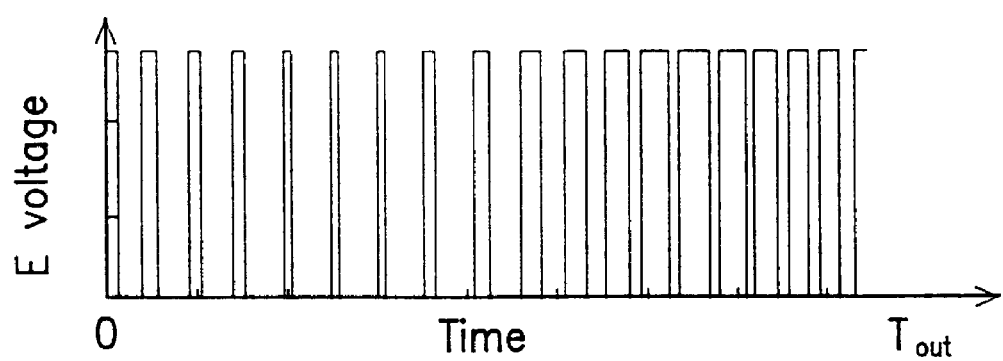
Figure 11D:
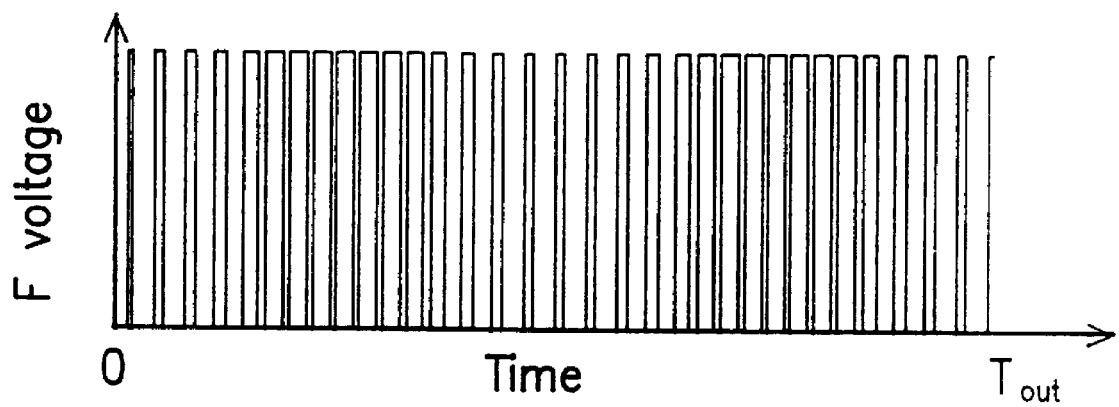
Figure 11E:
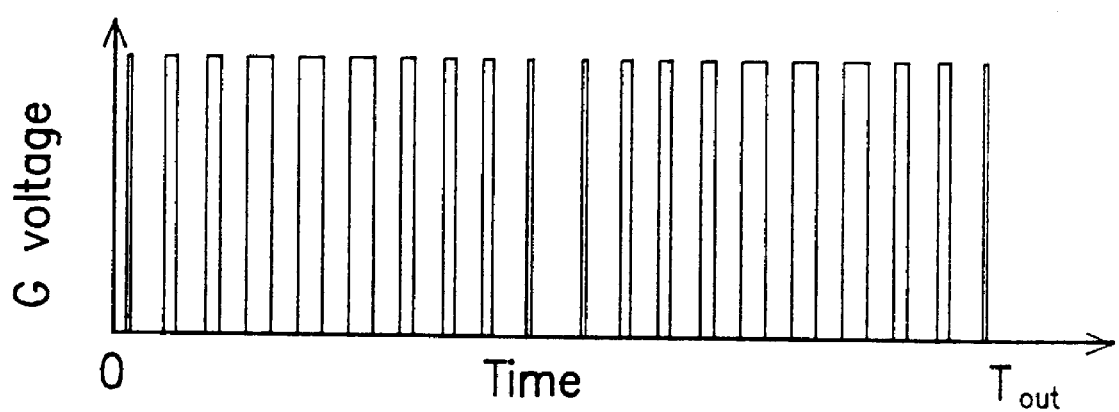

FIG. 10 is a circuit which generates the PWM signal $X_1$ in this embodiment and FIG. 11A to FIG. 11E respectively show signal diagrams at all nodes in the FIG. 10 circuit. In FIG. 10, triangular waveform generator 52 generates a triangular signal at node A, and sinusoidal waveform generator 54 generates a sinusoidal signal at node B. Both of the generators can be readily implemented by using commercial ICs or discrete devices by those skilled in the art. Inverter 56 inverts the sinusoidal signal at node B into an inverted sinusoidal signal at node C. Signals at nodes A, B and C are illustrated in FIG. 11A. The frequency of the sinusoidal signal at node B is the same as that of the AC voltage $V_a$, while the frequency of the triangular signal at node A is the same as the switching frequency of the switch device $S_1$ or the signal $X_1$ (that is, the period $t_0$–$t_3$ in FIG. 7). In addition, the amplitudes of both signals at nodes A and B can determine the duty cycle of the PWM signal $X_1$. Comparator 58 compares the triangular signal with the inverted sinusoidal signal and generates a first comparison signal at node D, as shown in FIG. 11B. At the same time, comparator 60 compares the triangular signal with the sinusoidal signal and generates a second comparison signal at node E, as shown in FIG. 11C. The XOR (Exclusive-OR) operator 62 deals with the signals at nodes D and E to generate a PWM signal at node F, as shown in FIG. 11D. Finally, processor 64 alternately removes the pulses of the PWM signal at node F in order to ensure that the duty cycle of the PWM signal is less than 50%. The PWM signal at node G is shown in FIG. 11E.

EXAMPLE

A prototype of a 1-kW series resonant DC-to-AC inverter has been designed and built to demonstrate the present invention. The specifications are given as follows:

Input DC voltage: $200V_{DC}$;
Output AC voltage: $110V_{AC}$;
Output frequency: 60 Hz; and
Output power: 1 kW.

The realization circuit is the circuit as shown in FIG. 4. The component parameters are calculated and obtained as follows: $L_f$=9.89 mH, $C_f$=16 μF, $L_0$=1 mH, and $C_o$=8.2 μF, in which both two cutoff frequencies of the filters are set at 400 Hz and 1.75 kHz, respectively. The optimal resonant components of the series resonant circuit are obtained by simulation in which the maximum output power is acquired. In this example, $L_r$=20.2 μH, $C_r$=0.94 μF, and the resonant frequency is given as 36.54 kHz. In addition, the pulse-width modulator, shown in FIG. 10, is realized with two IC 8038s, one for triangular waveform generator 52 and the other for sinusoidal waveform generator 54.

Figure 12:
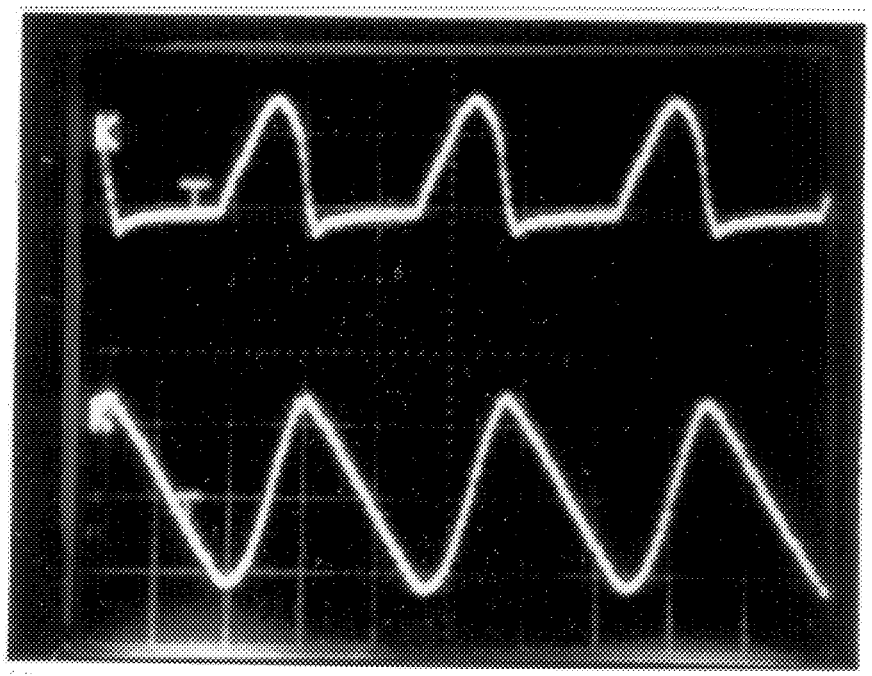
FIG. 12 is a photograph showing the measured waveforms of the resonant inductor current and the resonant capacitor voltage in the example of the preferred embodiment.
Figure 13:
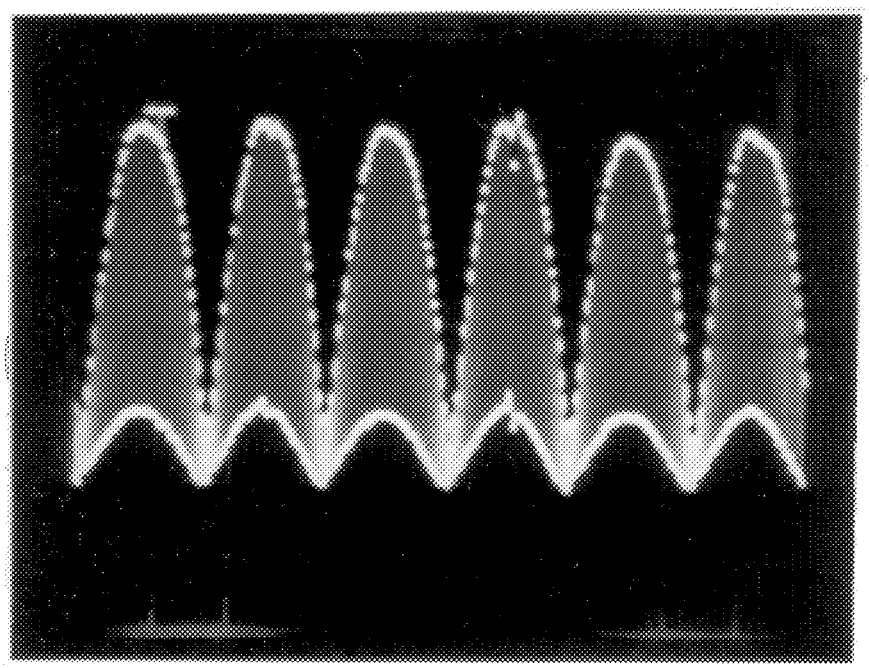
FIG. 13 is a photograph showing the measured waveform of the unipolar composite sinusoidal signal in the example of the preferred embodiment.
Figure 14:
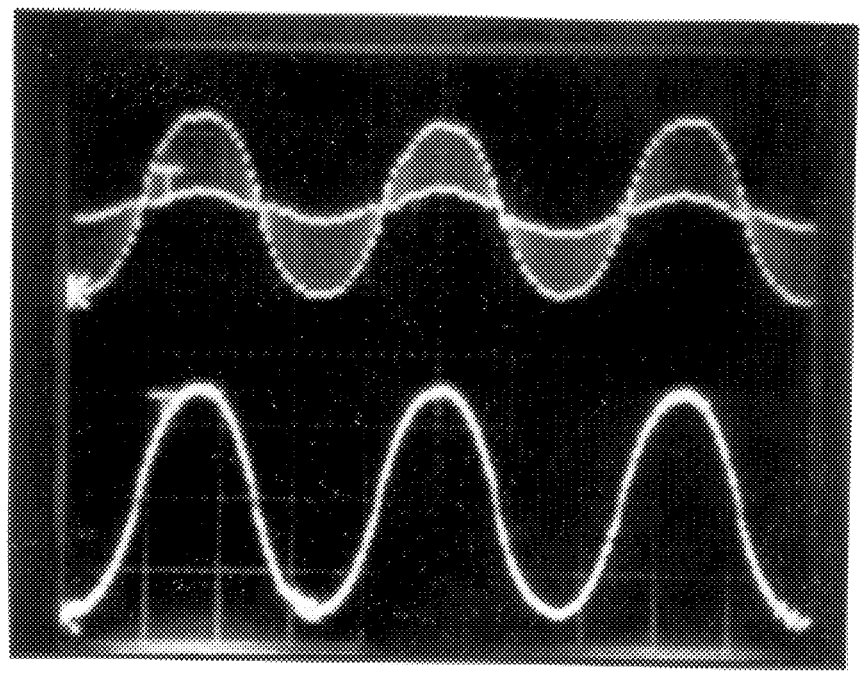
FIG. 14 is a photograph showing the measured waveforms of the bipolar composite sinusoidal signal and the AC voltage in the example of the preferred embodiment.

FIG. 12 is a photograph showing the measured waveforms of the resonant inductor current (the upper portion) and the resonant capacitor voltage (the lower portion) in this example, where the abscissa unit is 10 μsec/div and the ordinate units are 10 A/div and 100 V/div for current and voltage, respectively. Each of the pulses is shaped by the stages of charging, resonance and discharging. FIG. 13 is a photograph showing the measured waveform of the unipolar composite sinusoidal signal in the example, where the abscissa unit is 5 msec/div and the ordinate unit is 50 V/div. FIG. 14 is a photograph showing the measured waveform of the bipolar composite sinusoidal signal and the measured AC voltage in the example, where the abscissa unit is 5 msec/div and the ordinate units are 200 and 100 V/div, respectively. The power efficiency of this prototype is 84.86% with an output power of 600 Watts and 88% when the output power is 1 kWatt. The total harmonics without EMI filters are within 5 to 8%, which is quite low and meets the requirement of the present invention.

Advantages of the present invention are stated as follows. First, the AC voltage is directly synthesized by a series of quasi-sinusoidal pulses formed by series resonance. No square-pulsed voltage or current waveform will occur on the power switch during the switching period, so that high-frequency harmonic distortion can be apparently reduced. Second, switching frequency can be readily raised. Therefore, the dimensions of circuit devices, such as the transformer, may be smaller. This causes the inverter system to be smaller, lighter and cheaper. Third, switching stress can be reduced by remaining turn-on at zero-current and low finite-voltage switching and remaining turn-off at low finite-current and finite-voltage switching. Fourth, the structure adopted in the present invention is quite simple. This helps to improve the power efficiency.

The foregoing description of preferred embodiments of the present invention has been provided for purposes of illustration and description. It is not intended to be exhaustive or to limit the invention to the precise forms disclosed. Many modifications and variations will be apparent to practitioners skilled in this art. The embodiments were chosen and described to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A series resonant DC-to-AC inverter, comprising:
    a series resonant circuit including a resonant inductor and a resonant capacitor, coupled to a DC voltage;
    a diode having an anode and a cathode, connected in parallel with the series resonant circuit, the anode of the diode being connected to a negative terminal of the DC voltage, the cathode of the diode being connected to a positive terminal of the DC voltage;
    a first means responsive to a pulse-width-modulated signal for switching the conduction condition between the series resonant circuit and the DC voltage to generate a unipolar composite sinusoidal signal at the resonant capacitor;
    a cycloconverter for transforming the unipolar composite sinusoidal signal to a bipolar composite sinusoidal signal, connected in parallel with the resonant capacitor of the series resonant circuit; and
    a means for filtering out high-frequency components of the bipolar composite sinusoidal signal and generating an AC voltage.

2. The series resonant DC-to-AC inverter of claim 1, further comprising a means for filtering out bursts of the DC voltage.

3. The series resonant DC-to-AC inverter of claim 2, wherein the pulse-width-modulated signal is generated by a pulse-width modulator, which includes:
    a means for generating a sinusoidal signal with a frequency that is the same as the frequency of the AC voltage;
    a means for generating a triangular signal with a frequency that is the same as the switching frequency of the first switching means;
    a means for inverting the sinusoidal signal to generate an inverted sinusoidal signal;
    a means for comparing the inverted sinusoidal signal with the triangular signal to generate a first comparison signal;
    a means for comparing the sinusoidal signal with the triangular signal to generate a second comparison signal; and
    a means for operating an exclusive-or operation of the first comparison signal and the second comparison signal to generate a pulse-width-modulated signal.

4. The series resonant DC-to-AC inverter of claim 3, the pulse-width modulator further comprising:
    a means for alternately removing the pulses of the pulse-width-modulated signal whereby the duty cycle of the pulse-width-modulated signal is less than 50%.

5. The series resonant DC-to-AC inverter of claim 4, wherein the cycloconverter includes:
    a second means responsive to a first square-wave modulated signal for switching the conduction condition between one end of the resonant capacitor and one end of an output of the cycloconverter;
    a third means responsive to the first square-wave modulated signal for switching the conduction condition between another end of the resonant capacitor and another end of the output of the cycloconverter;
    a fourth means responsive to a second square-wave modulated signal that does not interlace with the first square-wave modulated signal for switching the conduction condition between the another end of the resonant capacitor and the one end of the output of the cycloconverter; and
    a fifth means responsive to the second square-wave modulated signal for switching the conduction condition between the one end of the resonant capacitor and the another end of the output of the cycloconverter.

6. The series resonant DC-to-AC inverter of claim 5, wherein each of the switching means is a MOS transistor.

7. A pulse-width modulator, comprising:
    a means for generating a sinusoidal signal;
    a means for generating a triangular signal;
    a means for inverting the sinusoidal signal to generate an inverted sinusoidal signal;
    a means for comparing the inverted sinusoidal signal with the triangular signal to generate a first comparison signal;
    a means for comparing the sinusoidal signal with the triangular signal to generate a second comparison signal; and
    a means for operating an exclusive-or operation of the first comparison signal and the second comparison signal to generate a pulse-width-modulated signal.

8. The pulse-width modulator of claim 7, the pulse-width modulator further comprising:
    a means for alternately removing the pulses of the pulse-width-modulated signal whereby the duty cycle of the pulse-width-modulated signal is less than 50%.

9. A method of inverting a DC voltage into an AC voltage, which comprises
    generating a unipolar composite sinusoidal signal having a unipolar sinusoidal waveform and high-frequency components by using the DC voltage;
    converting the unipolar composite sinusoidal signal into a bipolar composite sinusoidal signal having a bipolar sinusoidal waveform and high-frequency components; and
    filtering out the high-frequency components of the bipolar composite sinusoidal signal to generate an AC voltage.

10. The method of claim 9, wherein the step of generating the unipolar composite sinusoidal signal includes:

charging a resonant capacitor and a series-connected resonant inductor by the DC voltage during the logic high state of every pulse of a pulse-width-modulated signal;

charging the resonant capacitor by the stored energy of the resonant inductor during the logic low state of every pulse of the pulse-width-modulated signal until the stored energy of the resonant inductor falls to zero; and discharging the resonant capacitor during the logic low state of every pulse of the pulse-width-modulated signal until the next pulse comes, whereby the voltage of the resonant capacitor is the unipolar composite sinusoidal signal.

11. The method of claim 10, wherein a method of generating the pulse-width-modulated signal includes:

generating a sinusoidal signal with a frequency that is the same as the frequency of the AC voltage and its inverted sinusoidal signal;

generating a triangular signal with a frequency that is the same as the switching frequency of the pulse-width-modulated signal;

comparing the inverted sinusoidal signal with the triangular signal to generate a first comparison signal;

comparing the sinusoidal signal with the triangular signal to generate a second comparison signal; and operating an exclusive-or operation of the first comparison signal and the second comparison signal to generate the pulse-width-modulated signal.

12. The method of claim 11, further comprising:

alternately removing the pulses of the pulse-width-modulated signal whereby the duty cycle of the pulse-width-modulated signal is less than 50%.

* * * * *